(12) United States Patent
Biaud et al.

(10) Patent No.: US 9,126,509 B2
(45) Date of Patent: Sep. 8, 2015

(54) CHILD CAR SEAT FOR FITTING A VEHICLE SEAT

(75) Inventors: Richard Biaud, Trementines (FR); Nicolas Guilgault, Saint Macaire en Mauges (FR)

(73) Assignee: Dorel Juvenile Group, Inc., Foxboro, MA (US)

( * ) Notice: Subject to any disclaimer, the term of this patent is extended or adjusted under 35 U.S.C. 154(b) by 389 days.

(21) Appl. No.: 13/576,141

(22) PCT Filed: Jan. 28, 2011

(86) PCT No.: PCT/EP2011/051259
§ 371 (c)(1), (2), (4) Date: Sep. 10, 2012

(87) PCT Pub. No.: WO2011/092310
PCT Pub. Date: Aug. 4, 2011

(65) Prior Publication Data
US 2012/0326477 A1     Dec. 27, 2012

(30) Foreign Application Priority Data

Jan. 28, 2010 (FR) ..................................... 10 50606
Aug. 30, 2010 (FR) ..................................... 10 56852

(51) Int. Cl.
*B60N 2/28* (2006.01)

(52) U.S. Cl.
CPC ............ *B60N 2/2821* (2013.01); *B60N 2/2803* (2013.01); *B60N 2/2806* (2013.01);
(Continued)

(58) Field of Classification Search
CPC .. B60N 2/2851; B60N 2/2803; B60N 2/2812; B60N 2/2806; B60N 2/286; B60N 2/2863; B60N 2/2815; B60N 2/2818

USPC ...................... 297/256.16, 481, 250.1, 256.14
See application file for complete search history.

(56) References Cited

U.S. PATENT DOCUMENTS 4,854,639 A * 8/1989 Burleigh et al. ............ 297/250.1
5,899,534 A * 5/1999 Gray .............................. 297/484

(Continued)

FOREIGN PATENT DOCUMENTS

DE          4344812 A1      7/1995
WO    WO 2009131123 A1 *  10/2009

OTHER PUBLICATIONS

International Search Report completed by the ISA/EP on Apr. 29, 2011 in connection with PCT/EP2011/051259.

(Continued)

*Primary Examiner* — David R Dunn
*Assistant Examiner* — Tania Abraham
(74) *Attorney, Agent, or Firm* — Barnes & Thornburg LLP

(57) ABSTRACT

This invention has for object an automobile seat (1) for children, intended to be integral with the seat of a motor vehicle, of the so-called group 1/2/3 type, comprising a seat (2) and a seatback (3), said automobile seat offering two separate guide paths for a safety belt of said vehicle intended to maintain said seat and/or said child, respectively according to whether said seat is used in a so-called group 1 position or in a so-called group 2/3 position. The seat includes means for determining the position, group 1 or group 2/3, wherein said seat is located, and at least one passage indicator (53; 54; 57) of a strap of said safety belt of the vehicle able to have two different states, an active state and an inactive state, according to information and/or an action delivered by said means for determining the position.

19 Claims, 8 Drawing Sheets

(52) U.S. Cl.
CPC ............ *B60N2/2812* (2013.01); *B60N 2/2851* (2013.01); *B60N 2/286* (2013.01); *B60N 2/2863* (2013.01); *B60N 2002/2818* (2013.01)

(56) References Cited

U.S. PATENT DOCUMENTS

| | | | |
|---|---|---|---|
| 5,964,502 A * | 10/1999 | Stephens | 297/250.1 |
| 6,322,142 B1 * | 11/2001 | Yoshida et al. | 297/250.1 |
| 6,347,832 B2 * | 2/2002 | Mori | 297/256.13 |
| 6,412,866 B2 * | 7/2002 | Koyanagi et al. | 297/250.1 |
| 6,474,735 B1 * | 11/2002 | Carnahan et al. | 297/250.1 |
| 6,779,843 B2 * | 8/2004 | Kain | 297/250.1 |
| 6,857,700 B2 * | 2/2005 | Eastman et al. | 297/250.1 |
| 7,232,185 B2 * | 6/2007 | Hartenstine et al. | 297/250.1 |
| 7,300,113 B2 * | 11/2007 | Baloga et al. | 297/468 |
| 7,380,877 B2 * | 6/2008 | Konig et al. | 297/250.1 |
| 7,387,315 B2 * | 6/2008 | Nett et al. | 280/801.1 |
| 7,448,683 B2 * | 11/2008 | Rikhof | 297/250.1 |
| 7,452,031 B2 * | 11/2008 | Woellert et al. | 297/250.1 |
| 7,466,221 B1 * | 12/2008 | Lehr | 340/457.1 |
| 7,648,209 B2 * | 1/2010 | Weinstein et al. | 297/482 |
| 2002/0145318 A1 | 10/2002 | Asbach et al. | |
| 2009/0184548 A1 * | 7/2009 | Vickers et al. | 297/250.1 |

OTHER PUBLICATIONS

International Preliminary Report on Patentability completed on Aug. 7, 2012 and issued in connection with PCT/EP2011/0512589.

* cited by examiner

CHILD CAR SEAT FOR FITTING A VEHICLE SEAT

CROSS REFERENCE TO RELATED APPLICATIONS

This application is a U.S. nationalization under 35 U.S.C. §371 of International Application No. PCT/EP2011/051259, filed Jan. 28, 2011, which claims priority to French Application No. 1050606, filed Jan. 28, 2010, and French Application No. 1056852, filed Aug. 30, 2010. The disclosures set forth in the referenced applications are incorporated herein by reference in their entireties.

FIELD OF THE INVENTION

The field of the invention is that of child care. More precisely, the invention relates to automobile seats for children which are intended to be installed on the passenger seats of vehicles. It relates in particular to automobile seats for children adapted to receive children of variable sizes and or weights, and able to change in order to take into account the development of a child over several years. As such, the invention is applied to automobile seats that can evolve.

More particularly, the invention is applied to automobile seats that provide two types of restraint for the child, called "groups 1/2/3", and as such allowing for the evolution of the automobile seat from the group 1 category, for children whose weight is between 9 and 18 kg, to the group 2/3 category for children whose weight is between 15 and 36 kg.

PRIOR ART

Group 1/2/3 automobile seats adapted to small as well as big children, i.e. evolving, are known. These automobile seats must be adapted to different types of restraint. The first type of restraint is a harness with shoulder straps integral with the automobile seat for the smallest children (group 1). In this case, the belt of the vehicle can be used to maintain the automobile seat on the seat of the vehicle, unless the latter is maintained by dedicated means, such as Isofix® clamps.

The second type of restraint, approximately starting at the age of 3 years, more precisely starting from a weight of the child greater than or equal to 15 kg, is the three-point seat belt of the vehicle in order to maintain the child (group 2/3).

It is sometimes difficult to not be mistaken, or at least to not hesitate, in the fastening of the automobile seat to the vehicle, as there are multiple belt passage points of the vehicle to be used or not to be used according to the use in group 1 or in group 2/3 of the automobile seat.

In particular, this belt must not be used to maintain the child in group 1, whether to replace the harness or as a complement to the latter. Inversely, in group 2/3, the child must be maintained by this safety belt, not by the harness.

In order to attempt to limit this risk, regulatory indicators have been provided, placed at the suitable locations for each of the two groups. However, this is a system for aid, or for assistance, which is solely informative, which does not make it possible to prevent misuse.

OBJECTIVES OF THE INVENTION

The invention has therefore in particular for objective to overcome all or a portion of these disadvantages of prior art.

More precisely, the invention has for objective to facilitate and secure the use of such an automobile seat of the group 1/2/3.

There is always a need to prevent the user from making a mistake in the method for restraining the child according to his age and his morphology.

The invention aims in particular to respond to all or a portion of these needs.

DESCRIPTION OF THE INVENTION

The invention achieves this thanks to an automobile seat for children, intended to be integral with the seat of a motor vehicle, of the so-called group 1/2/3 type, comprising a seat and a seatback, said automobile seat proposing two separate guide paths for a safety belt of said vehicle intended to maintain said seat and/or said child, respectively according to whether said seat is used in a so-called group 1 position or in a so-called group 2/3 position.

According to the invention, the automobile seat comprises means for determining the position, group 1 or group 2/3, wherein said seat is located, and at least one passage indicator of a strap of said safety belt of the vehicle able to have two different states, an active state and an inactive state, according to information or an action delivered by said means for determining the position.

The automobile seat further comprises means for determining the position, group 1 or group 2/3, wherein said seat is located, and at least one passage indicator of a strap of said safety belt of the vehicle able to have two different states, an active state and an inactive state, according to information and/or an action delivered by said means for determining the position.

At least one of the passage indicators can include at least one mobile part, blocking or preventing access to a strap passage defined on the seat, in the inactive state, and authorising access to the strap passage in the active state.

At least one of the passage indicators can include at least one lighted indicator element and/or having a first information able to be seen in the active state.

Said means for determining can moreover take the position of a mobile headrest in relation to said seatback into account.

In particular, the automobile seat can include means for controlling and/or actuating at least one of said strap passage indicators controlled by said headrest.

The headrest can be mobile in relation to seatback on the one hand between a position of minimum height and an intermediate position and on the other hand between the intermediate position and a position of maximum height. In this case, the means for controlling and/or actuating can be configured to control the value taken by at least one of the strap passage indicators according to whether the position of the headrest is between the position of minimum height and the intermediate position or between the intermediate position and the position of maximum height.

Moreover, in an embodiment, the automobile seat comprises a harness of which the shoulder straps can be configured to be able to be retracted during the switching from the use in group 1 to the use in group 2/3.

In this case, the means for actuating can for example include one or several actuating handles also allowing for a retraction of the shoulder straps.

As such, when the shoulder straps are retracted by a user, a switch occurs from the automobile seat in group 1 to a use of the automobile seat in group 2/3, which induces a change in the means of restraining and/or in the guide path of the safety belt of the vehicle. In the case where the means for actuating include one or several actuating handles allowing for a retraction of the shoulder straps, a simultaneous action can be induced consisting in modifying the value taken by at least one of the strap passage indicators. This makes it possible to guide the user in the use of the automobile seat.

Inversely, when the retracted shoulder straps are put back in place, a switch occurs from a use of the automobile seat in group 2/3 to a use of the automobile seat in group 1, which induces the use of the harness of the automobile seat in place of the safety seat belt of the vehicle in order to maintain the child. This safety belt then provides solely the fastening of the automobile seat to the vehicle.

The safety seat belt of the vehicle generally has, when it is set into place to maintain the child in the vehicle, a ventral strap and a chest strap.

The automobile seat can include:
- at least one first belt passage integral with the seatback and intended to receive the chest strap of the safety belt, when the automobile seat is used in group 1,
- at least one second belt passage integral with the headrest and intended to receive the chest strap of the safety belt, when the automobile seat is used in group 2/3,
- at least one first indicator associated with each of the first passages configured to have an active value when the automobile seat is used in group 1 and an inactive value when the automobile seat is used in group 2/3,
- at least one second indicator associated with each of the second passages configured to have an active value when the automobile seat is used in group 2/3, and an inactive value when the automobile seat is used in group 1.

The presence of the first indicator can make it possible to guide the user in the fastening of the automobile seat to the seat of the vehicle for the use of the automobile seat in group 1.

The presence of the second indicator can make it possible to guide the user in the method for restraining the child in the automobile seat for the use of the automobile seat in group 2/3.

The active state or active value of the first and/or second indicator can consist for example of a colour that attracts attention, for example the colour red.

The inactive state or inactive value of the first and/or second indicator can consist for example of a colour that does not attract attention, for example a neutral colour, grey, black or white in particular, or in the absence of colour.

The headrest can be mobile in relation to seatback on the one hand between a position of minimum height and an intermediate position and on the other hand between the intermediate position and a position of maximum height. In this case, the means for actuating the headrest can be configured to control the value taken by the strap passage indicator or indicators according to whether the position of the headrest is between the position of minimum height and the intermediate position or between the intermediate position and the position of maximum height.

In this case also, the automobile seat can be such that:
- the first belt passage integral with the seatback is intended to receive the chest strap of the safety belt when the position of the headrest is between the position of minimum height and the intermediate position,
- the second belt passage integral with the headrest is intended to receive the chest strap of the safety belt when the position of the headrest is between the intermediate position and the position of maximum height,
- the first indicator associated to each of the first passages is configured to take an active value when the position of the headrest is between the position of minimum height and the intermediate position, and an inactive value when the position of the headrest is between the intermediate position and the position of maximum height, and
- the second indicator associated to each of the second passages is configured to take an active value when the position of the headrest is between the intermediate position and the position of maximum height and an inactive value when the position of the headrest is between the position of minimum height and the intermediate position.

When the automobile seat is used in group 1, it can include a base whereon the seat can be mounted. In this case, said means for determining take the presence or the absence of said base into account.

In particular, the automobile seat can include means for controlling and/or actuating the strap passage indicator or indicators according to the presence or the absence of a base whereon the seat can be mounted. The base can include at least one element controlling the passage into the inactive state of an indicator associated with a ventral strap passage of the safety belt.

In the case where the automobile seat comprises a base, the automobile seat, in particular the seat, can include at least one third passage indicator of the ventral belt, able to have two values, i.e. an active or inactive value according respectively to the presence or the absence of the base. The base can then comprise means for the actuating of the third strap passage indicator.

The active or inactive states or values of the third indicator can be such as indicated hereinabove in reference to the first and second indicators.

The presence of the third indicator can guide the user in the method for restraining the child when the automobile seat is used in group 2/3.

The base can include means for guiding a ventral strap of a safety belt of the vehicle when the seat is used in group 1.

An embodiment can consider providing a permanent link between the seat and/or the seatback and the base, the base being under the seat. A third and a fourth strap passages and indicators can be provided in this case.

The base can comprise means for retracting the crotch piece arranged in order to retract the crotch piece when the automobile seat is used in group 2/3 and in order to allow the crotch piece to appear when the automobile seat is used in group 1.

In this case, the seat can comprise a housing of the crotch piece able to receive the crotch piece when the seat is used in group 2/3. Also in this case, the means for retracting can be controlled by the base.

LIST OF FIGURES

Other characteristics and advantages of the invention shall appear more clearly when reading the following description of an embodiment of the invention, given by way of example and in a non-restricting manner, and of the annexed drawings wherein:

FIG. 1 diagrammatically shows in perspective an automobile seat in accordance with the invention utilised in group 1, the automobile seat being shown occupied by a child and fastened to a seat of a vehicle, FIG. 2 diagrammatically shows the automobile seat of FIG. 1 utilised in group 2/3, occupied by a child, the child being attached using the belt of the vehicle, FIG. 3 shows, diagrammatically in perspective, the automobile seat of FIG. 1, without a child and not attached to the seat of the vehicle, FIG. 4 shows the automobile seat of FIG. 2, without a child and not attached to the vehicle, FIG. 5 is a diagrammatical view of the rear and in perspective of the automobile seat of FIG. 3, FIG. 6 shows, diagrammatically in perspective, the automobile seat of FIG. 4 seen from behind as well as the base which has been removed from this automobile seat in order to switch it from the group 1 to the group 2/3, FIG. 7 shows, diagrammatically and partially, in perspective, the seatback and the headrest of the automobile seat of FIG. 1 seen from the front, FIG. 8 shows, seen from behind, diagrammatically and partially, in perspective, the seatback of an automobile seat in accordance with the invention, FIG. 9 shows in perspective, diagrammatically and partially, seen from behind, the seatback of the automobile seat in accordance with the invention utilised in group 2/3, FIG. 10 is a view similar to that of FIG. 9, with the automobile seat being used in group 1, FIG. 11 shows in perspective, diagrammatically and partially, the seat of an automobile seat in accordance with the invention utilise in group 1, the seat being devoid of lining, FIG. 12 is a view similar to that of FIG. 11, with the automobile seat being used in group 2/3, FIG. 13 shows, diagrammatically, another embodiment of the automobile seat in accordance with the invention utilised in group 1, FIG. 14 is a diagrammatical view in perspective of the automobile seat of FIG. 13 utilised in group 2/3, and FIG. 15 shows the automobile seat of FIG. 13, diagrammatically and partially, viewed from the side, when it is in an inclined position.

DETAILED DESCRIPTION OF AN EMBODIMENT OF THE INVENTION

1. Principle of the Invention

Figure 1:
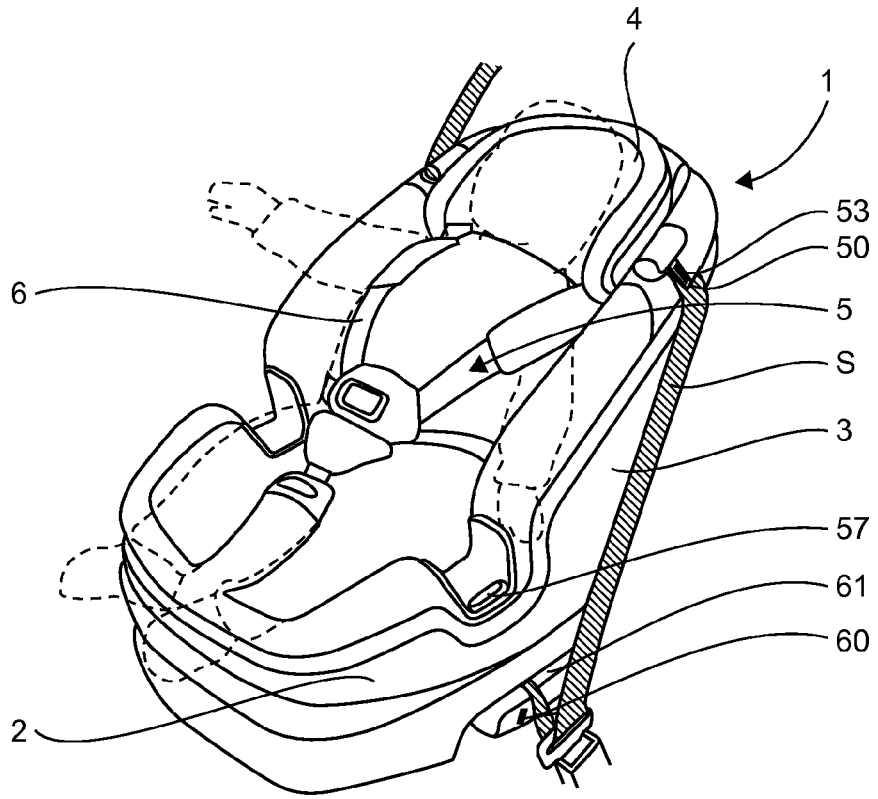

The invention therefore proposes a simple and effective solution, in order to avoid the risks of errors and incorrect installations of a safety belt during the installation of an automobile seat for children in an automobile vehicle, according to whether the latter is used in group 1 or in group 2/3.

For this, a seat of the invention implements indicators, indicating the strap passages to use, and/or fool-proof devices, prohibiting the use of the strap passages which must not be used. These indicators and/or these fool-proof devices are controlled, or driven, by means for determining the position of the automobile seat, according to whether it is in group 1 or in group 2/3.

According to the embodiments, this determination can be carried out, for example, by the presence (group 1) or the absence (group 2/3) of a removable base, the detection of the height of the headrest (low in group 1, high in group 2/3), the presence (group 1) or the absence (group 2/3) of the harness, etc.

According to the embodiments, the means for determining can control the lighting of diodes designating the strap passages to use, or displace, for example using control rods, connecting rods and/or cables of mobile parts, playing the role of an indicator (having for example a green colour or a red colour appear) according to the position, and/or forming a fool-proof device, for example by blocking a strap passage which must not be used.

2. Particular Embodiment

2.1 Incorporation by Reference

This application incorporates by reference the contents of unpublished patent application no. FR 1050606 of which it claims priority. The embodiment described hereinafter corresponds to the technique described in this patent application.

The invention therefore proposes an adjustable automobile seat, intended to be used according to the cases with an integrated harness (group 1 for example) or with the safety belt of the vehicle (group 2/3 for example) for the maintaining of the child.

According to the invention, means for managing strap passage indicators of the safety belt of the vehicle are provided, in such a way as to modify these indicators according to the use required (group 1 or group 2/3 for example), in such a way that the implementation of this safety belt for the maintaining of the automobile seat and/or of the child is adapted, according to the situations.

2.2 Description of the Seat

FIGS. 1 to 6 show an automobile seat 1 for children in accordance with the invention, intended to be fastened to a seat of a motor vehicle. The automobile seat 1 comprises a seat 2, a seatback 3, a headrest 4, which is, in this embodiment, mobile in relation to seatback 3, and a harness 5 comprising two shoulder straps 6 and a crotch piece 7.

The automobile seat is designed to be implemented with two separate means of retention, according to the size and/or the weight of the child:

the harness 5, in a so-called group 1 position;

a safety belt of the vehicle, in a so-called group 2/3 position.

In this example shown, the headrest 4 is mobile in relation to the seatback 3 between a position of minimum height and a position of maximum height, passing through an intermediate position, which can in particular correspond to the transitory position between the group 1 and the group 2/3. The headrest 4 can have for example a plurality of positions between the positions of extreme height, defined for example by a rack.

In the embodiment shown, the shoulder straps 6 are each fastened at two points of the automobile seat 1, i.e. four fastening points, and the crotch piece 7 is fastened in one point of the automobile seat, in such a way that the harness is of the five-point harness type. The shoulder straps 6 each include a portion intended to maintain the torso of the child and a portion forming a ventral strap portion. The shoulder straps 6 and the crotch piece 7 are brought together during the retaining of a child in a harness buckle 9 comprising a button 10 for controlling the opening of the harness 5.

The shoulder straps 6, include, in the example shown, two shafts 11 forming sleeves around shoulder straps 6 and comprising a fabric having a high coefficient of friction making it possible to restrain the child in the event of impact. An end portion 12 of the harness 5, able to be seen in the FIG. 3, makes it possible for a user to adjust the length of the shoulder straps 6 of the harness 5. In order to reduce the length of the shoulder straps 6, for example the end portion 12 of the harness are pulled and in order to release and increase the length of the shoulder straps, for example a button 13 located on the base 8 of the crotch piece 7 is pressed.

Figure 2:
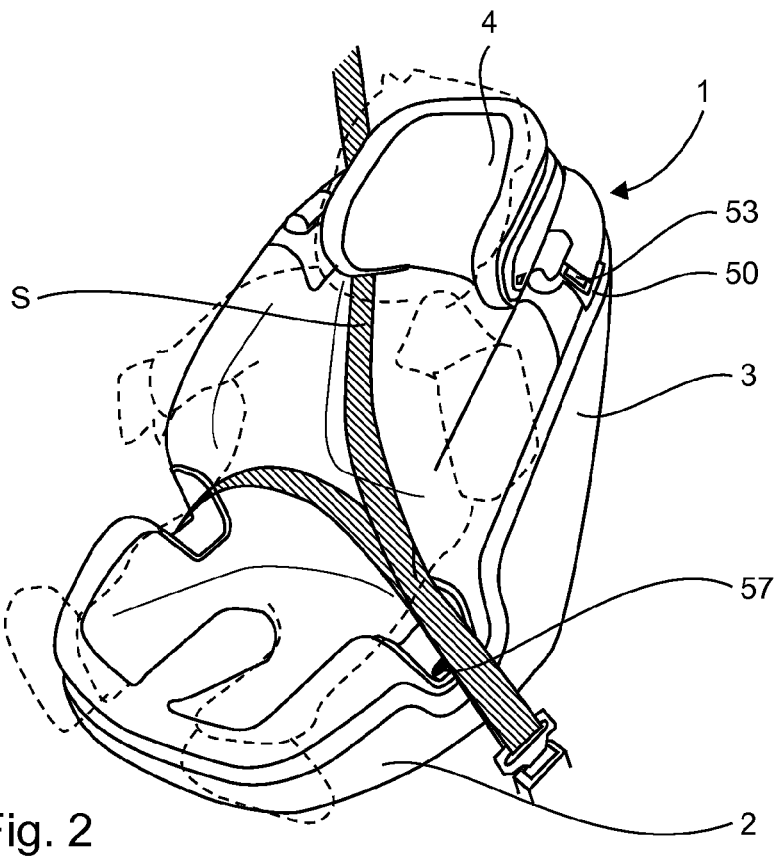
Figure 4:
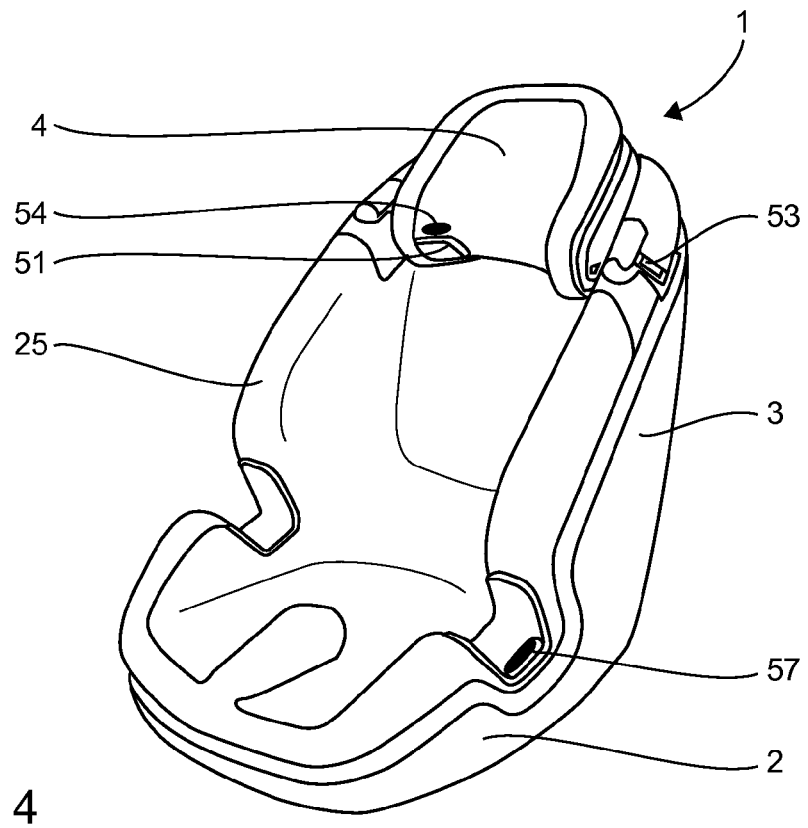

In the example shown, the automobile seat 1 comprises, or cooperates with, a base 20 whereon the seat 2 is mounted, in particular when the automobile seat is used in group 1. When the automobile seat is used in group 2/3 as shown in FIG. 2 or FIG. 4 for example, the base 20 is detached from the seat 2, as shown in FIG. 6, using for example a disengagement button 21 visible in FIGS. 5 and 6.

The presence of the base 20 can allow for example the raising of the automobile seat 1 when it is used in group 1 and/or the inclining of the seat 2 and of the seatback 3 relative to the base 20 and/or the rotation of the seat 2 relative to the base 20.

Figure 5:
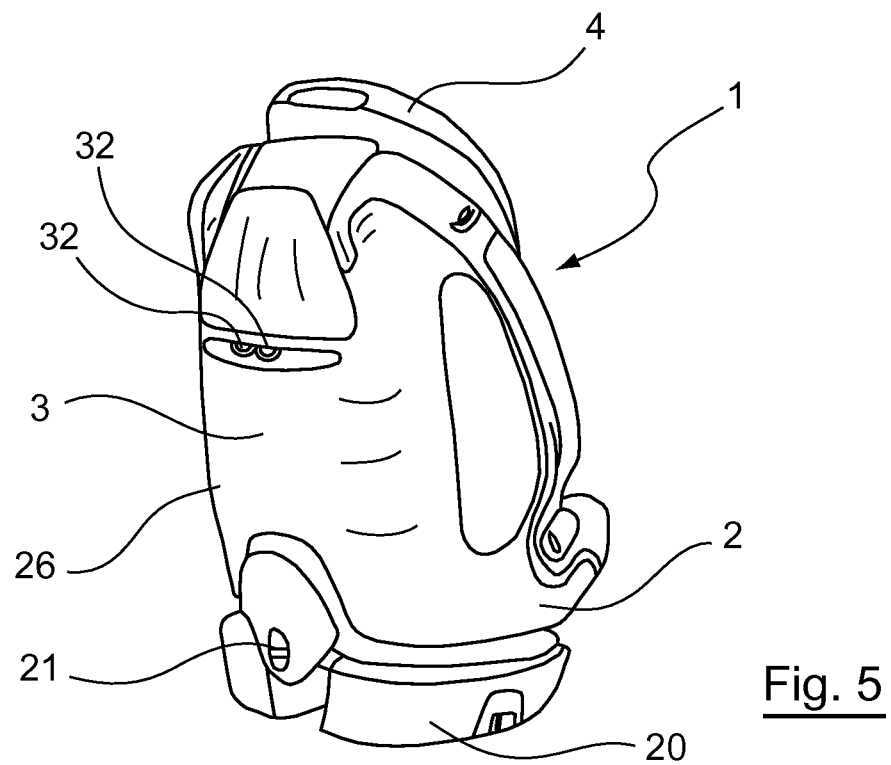
Figure 6:
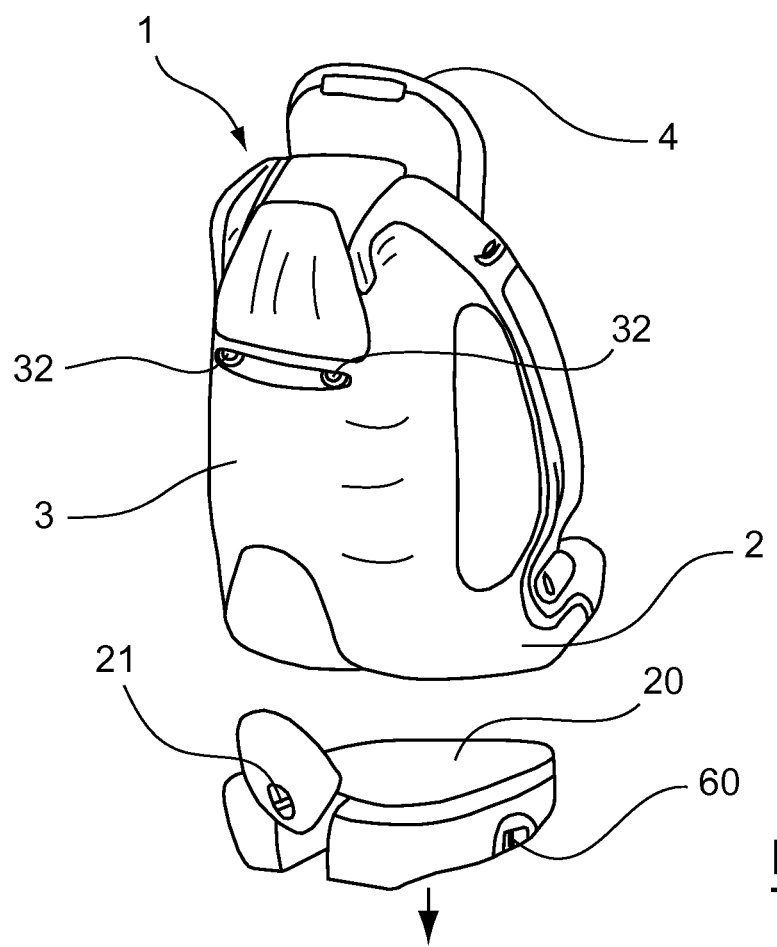

In the FIGS. 1 to 6, it can be seen that the automobile seat is covered with a lining 25 made of fabric on the front of the automobile seat and with a shell 26 for example made of plastic which can be seen in FIGS. 5 and 6 and substantially covering the seatback, at the rear of the automobile seat.

2.3 Removable Harness

Figure 7:
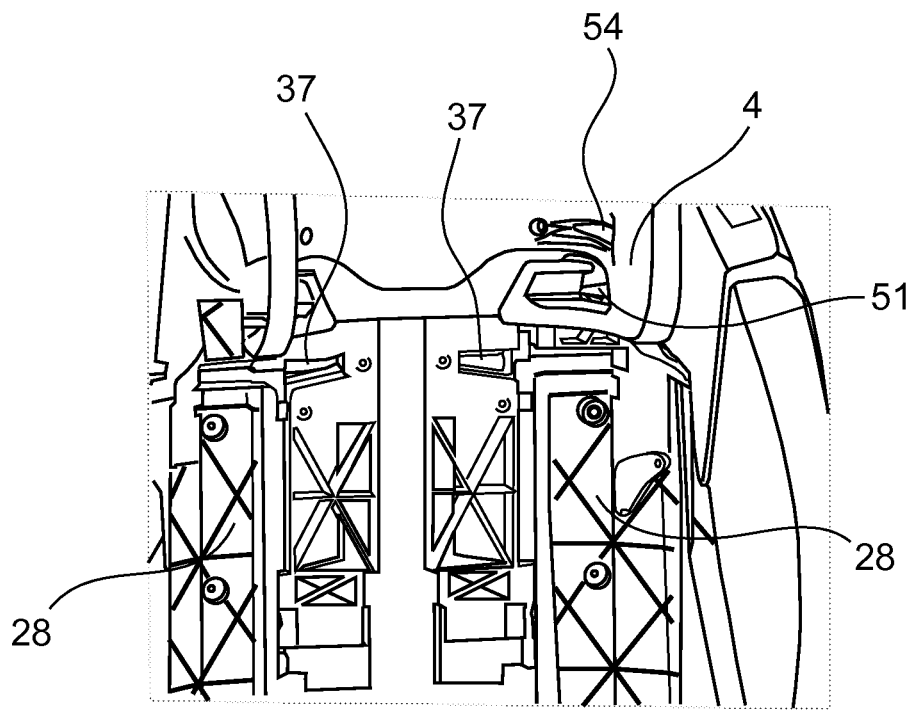

The automobile seat 1 comprises, in the embodiment shown, means for retracting 30 shoulder straps, unable to be seen in FIGS. 1 to 6 but which can be seen in FIGS. 8 to 10 and described hereinafter. The means for retracting 30 the shoulder straps 6 of the harness 5 are arranged in such a way that the shoulder straps 6 can have two states:

an accessible state when the headrest 4 is located between a position of minimum height and an intermediate position;

a retracted state, wherein the shoulder straps 6 are arranged in at least one housing 28, two in the example shown which can be seen in FIG. 7, provided for this purpose in the seatback, when the headrest 4 is located between the intermediate position and a position of maximum height.

The housings 28 of the shoulder straps 6 are formed in a hollow in the seatback 3.

Figure 3:
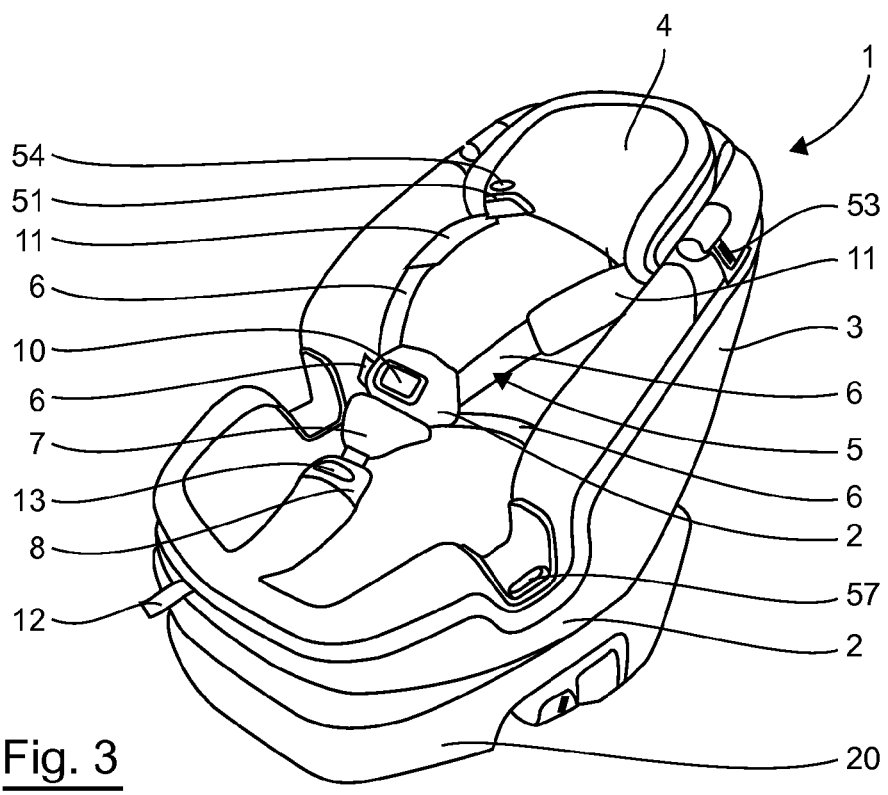

For the uses of the automobile seat 1 in group 1, the harness 5 is used, with the shoulder straps 6 then being in an accessible state as shown in FIGS. 1 and 3. For the use of the automobile seat 1 in group 2/3, the shoulder straps 6 are in the retracted state, as shown in FIGS. 2 and 4.

The lining of the headrest 4 and of the seat 2 makes it possible in particular to dissimulate the shoulder straps 6 and more generally the harness 5, although the latter is still present in the automobile seat shown in FIGS. 2 and 4.

Note that, in this embodiment, the harness is never detached from the seat, but only rendered inactive, in its retracted state. As such, there is no risk of losing the harness, or of a use without harness in group 1.

In order to switch the shoulder straps 6 from an accessible state to a retracted state and reciprocally, the user can actuate at least one actuating handle 32, in the number of two in the example shown. Such actuating handles can have different forms, for example a recessed circle shape as shown in FIGS. 5 and 6 or a stick shape as shown in FIGS. 8 to 10, with these forms of actuating handles 32 not being limiting.

In FIG. 5, the actuating handles 32 are shown close together, and the shoulder straps 6 are then in the accessible state. In FIG. 6, the actuating handles 32 are shown separated, and the shoulder straps 6 are then in the retracted state.

The automobile seat 1 shown in FIGS. 1 to 6 comprises first means of abutting 35 preventing the passage for the headrest 4 from the intermediate position to a higher position as long as the shoulder straps 6 are not in the retracted state.

The automobile seat shown in FIGS. 1 to 6 further comprises second means of abutting 36 preventing the passage for the headrest 4 from the intermediate position to a lower position as long as the shoulder straps 6 are not in the accessible state.

Figure 8:
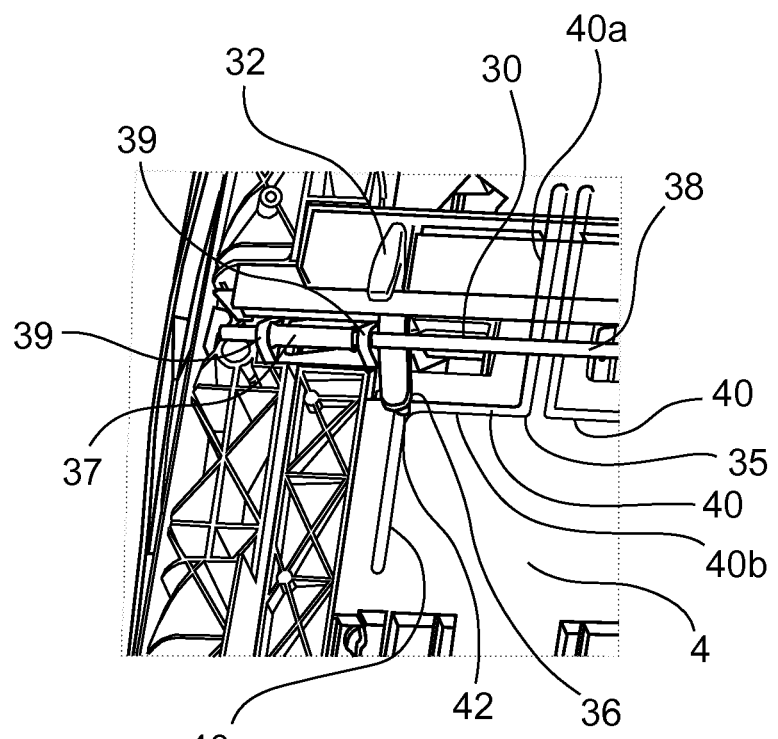
Figure 9:
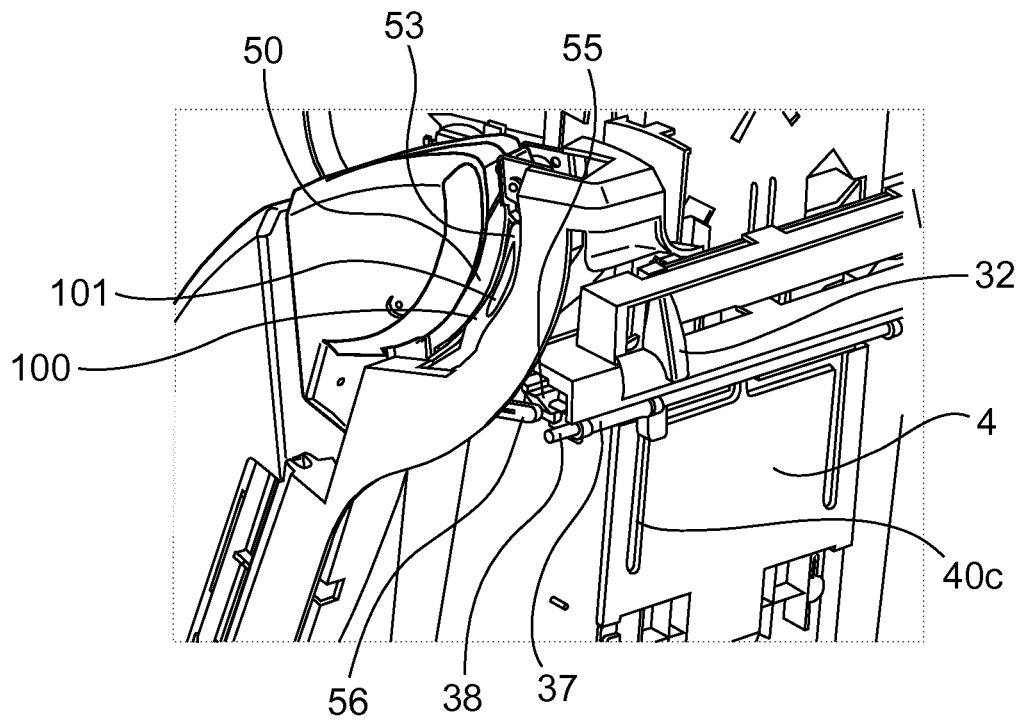
Figure 10:
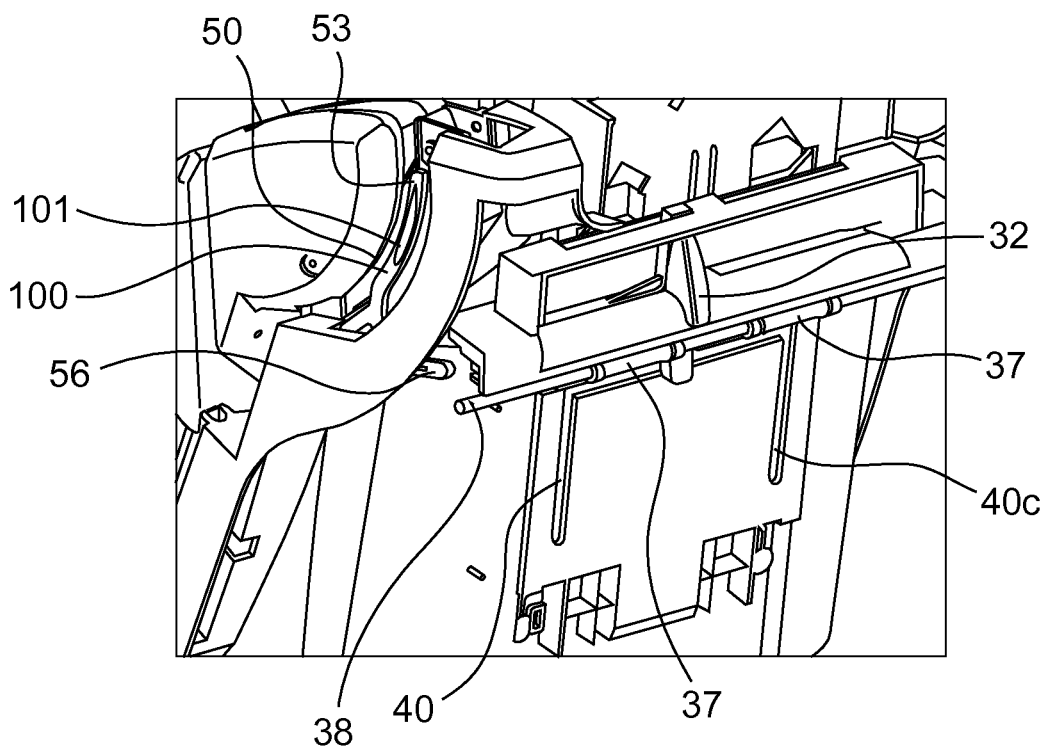

The first and second means of abutting 35 and 36 can be seen in FIGS. 8 to 10 for example. In these figures, it can be seen that the headrest 4 comprises two grooves 40 in the shape of a step comprising a high portion 40a, vertical and arranged centrally, a low portion 40c, vertical and arranged laterally, the high 40a and low 40c portions being connected together by a horizontal intermediate portion 40b.

The displacement of the actuating handles 32 from the interior to the exterior of the automobile seat or from the exterior to the interior of the automobile seat causes the displacement of sleeves 37 able to slide along a horizontal rod 38. The shoulder straps 6, in particular an end portion of the latter, are each integral with a sleeve 37. The end portion of each shoulder strap 6 can form a buckle around a sleeve 37, for example, in such a way that cannot be seen in the figures, FIGS. 7 to 10 being shown devoid of shoulder straps 6, with a concern for clarity of the drawing. The actuating handles 32 are integral with a driving part 39 able to slide on the rod 38 and surrounding the sleeve 37, in such a way as to drive it through sliding along the rod in one direction as well as in the other direction according to the displacement of the corresponding actuating handle 32.

A finger 42 is arranged to slide in the groove 40. This finger 42 is integral with the actuating handle 32. As such, when the actuating handle 32 is displaced, the finger 42 is also displaced along the portion 40b of the groove. This displacement is possible only when the headrest 4 is in the intermediate position shown in FIGS. 8 to 10.

When the headrest 4 is in the position of minimum height (not shown in the figures), the finger 42 is located at the upper end of the groove 40a, with the handles 32 then being in the close state corresponding to the accessible state of the shoulder straps 6.

By raising the headrest, the finger 42 slides along the groove 40 in its high portion 40a, until it abuts on the first means of abutting 35 when the headrest 4 has reached the intermediate position corresponding to the arrival of the finger 42 in the intermediate portion 40b of the groove. The first means of abutting 35 are constituted in this example by an edge of the groove 40 corresponding to the lower end of the high portion 40a of the groove.

The actuating handles 32 must then be actuated by separating them, and, through this gesture, switch the shoulder straps 6 from the accessible state to the retracted state.

During this movement of the actuating handles 32, the finger 42 is displaced in the groove 40 in its intermediate portion 40b, horizontally, from the interior to the exterior of the automobile seat.

When the actuating handles 32 are in separated position corresponding to the retracted state of the shoulder straps, the finger 42 has arrived at the lateral end of the intermediate portion 40b of the groove. It is then possible to again raise the headrest 4, from the intermediate position to a position of maximum height. During this displacement of the headrest 4, the finger 42 is displaced along the low portion 40c of the groove, to the lower end of the latter, when the headrest has reached a position of maximum height.

When the headrest 4 is in the position of maximum height, the finger 42 is in the lower end of the groove 40, in its low portion 40c.

If the headrest 4 is displaced from the position of maximum height in order to lower it, the finger 42 slides in the groove portion 40c until it abuts against the second means of abutment 36, which form the upper end of the low portion 40c of the groove, when the headrest 4 has reached the intermediate position. It is no longer possible to lower the headrest, as long as the actuating handles 32 have not been actuated in such a way as to pass the shoulder straps 6 from the retracted state to the accessible state, by displacing the sleeves 37 integral with the shoulder straps 6.

Once the shoulder straps 6 are in the accessible state, the headrest 4 can then be lowered again, from the intermediate position to the position of minimum height, with the finger 42 then sliding in the high portion 40a of the groove 40.

Note that, in the sliding movement between the finger 42 and the groove 40, it is not the finger 42 which is displaced, but the groove 40 integral with the headrest 4.

Of course, other mechanical means, for the manual, or where applicable motorised, control of the displacement of the harness from the retracted state to the accessible state, and reciprocally, can be considered, in the form of cables, control rods, connecting rods, guides, etc., when these mechanical means are actuated by systems for actuating (buttons that are mobile through sliding and/or rotation, motor, etc.) which can be actuated only in the intermediate position.

Although, in certain embodiments, it can be provided that the intermediate position correspond to an intermediate zone (i.e. to several intermediate positions wherein the actuating would be possible), this intermediate position can be unique.

Furthermore, in light in particular of the current regulations, the intermediate position is adapted to allow, in this particular position and only in this position, that the two states (accessible and retracted) are available, and therefore the two uses (group 1 and group 2/3) are possible.

2.4 Controlling of the Strap Passages

The automobile seat comprises different strap passages of the safety belt of the seat, which can be seen in particular in FIGS. 1 and 2, provided to guide the straps on the automobile seat in such a way as to maintain it effectively. This maintaining differs according to the uses. For the use in group 1, the automobile seat 1 is fixed to the seat of the vehicle using the safety belt of the vehicle and the child is attached using the harness 5 of the automobile seat. For the use in group 2/3, the child is maintained using the safety belt of the vehicle.

The automobile seat therefore comprises, as shown in FIGS. 1, 2 and 9, 10, at least one first strap passage 50 integral with the seatback 3 and intended to receive the chest strap S of the safety belt in the accessible state of the shoulder straps. This first strap passage has, in the illustrated embodiment, substantially a L shape, as shown in particular in FIG. 2. The substantially vertical branch of the L id a zone for introducing the strap, said strap having to be displaced, in a normal working, on the second substantially horizontal branch. A cover, mobile for example about a rotation axis, may be foreseen to close or allow the access to said passage 50.

The automobile seat 1 further comprises at least one second strap passage 51 integral with the headrest 4, able to be seen in the FIG. 7 in particular, and intended to receive the chest strap S of the safety belt in the retracted state of the shoulder straps.

The automobile seat 1 comprises for example at least one passage indicator of a strap of a safety belt of the vehicle, able to have two states, also called values, that are different according to the use in group 1 or in group 2/3. In the example shown, the passage indicator can have two different values according to the accessible or retracted state of the shoulder straps (which correspond respectively to a use in group 1 or in group 2/3 of the automobile seat, in this example).

In the example shown, the automobile seat comprises a first indicator 53, which can be seen in particular in FIGS. 9 and 10, each associated with first passages 50 and configured to have an active value in the accessible state and an inactive value in the retracted state. The automobile seat further comprises in the example a second indicator 54, which can be seen in particular in FIGS. 7 and 8, associated with each of the second passages 51 and configured to have an active value in the retracted state and an inactive value in the accessible state.

The passage indicator 53 comprises a mobile part 100, blocking or preventing access to a strap passage defined on the seat, in the inactive state, and authorising access to the strap passage in the active state, as can be seen in FIGS. 9 and 10.

The passage indicator 53 further comprises at least one indicator element 101 having a first information able to be seen in the active state. In the example shown, the indicator element 101 is an element of red colour, and the inactive value is the absence of the red colour due to the mobility of the mobile part 100 which retracts the indicator element in inactive state.

In the illustrated example in FIG. 1, the indicator 53 has an active value (for example a red color) whereas in the illustrated example in FIG. 2, the indicator 53 has an inactive value (for example the absence of the red color). As can be seen more precisely in FIGS. 9 and 10, the indicator 53 has an active value able to be seen in the FIG. 10 and an inactive value able to be seen in the FIG. 9. A tip 55, integral with the actuating handle 32, is arranged to press on a lever 56 making it possible to give to the indicator 53 an inactive value, with the mobile part 100 displaced in such a way as to render invisible the indicator element 101, when the shoulder straps are in the retracted state. The first strap passages 50 are intended to not be used in the use in group 2/3 of the seat. On the contrary, when the actuating handles 32 switch the shoulder straps 6 from the retracted state to the accessible state, there is no longer any contact between the tip 55 and the lever 56, in such a way that the mobile part 100 of the indicator 53 is released and returns, using means for recalling such as a spring (not able to be seen), in the position wherein the indicator has an active value, i.e. the appearance of the indicator element 101 forming a red tab along the first strap passage. This indicates to the user the location of the passage 50 of the safety belt, when the seat is used in group 1.

The displacement of the actuating handles 32 also controls in the example shown the change in value of the second indicator 54. When the shoulder straps 6 are in the retracted state, the second indicator 54 has an active value, in such a way as to guide the user to the second passages 51, so that he passes the chest strap of the safety belt of the vehicle by these second passages. On the contrary, when the shoulder straps 6 are in the accessible state, the indicator 54 has an inactive value so that the user does not put the strap into the second passages 51 but into the first passages 50 which have a first associated indicator 53 which is in an active value.

In the example shown, the automobile seat comprises at least one third indicator 57 of the passage of the ventral strap of the safety belt of the vehicle, which can be seen in particular in FIGS. 1 and 2, able to have two values, i.e. an active or inactive value according respectively to the use of the automobile seat in group 1 or in group 2/3. In the example shown, the third indicator 57 can have an active or inactive value according respectively to the presence or the absence of the base 20.

In the example shown in FIG. 1, the third indicator 57 has an inactive value, for example of grey colour. In the example shown in FIG. 2, the third indicator 57 has an active value for example of red colour.

In this example, the change in value of the third indicator is controlled by the fastening or the unfastening of the base 20 in relation to the seat 2. By removing the base 20 from the seat, the third indicator changes from the inactive value to the active value. When returning the base 20 to the seat, the third indicator changes from the active value to the inactive value.

Note that the base 20 comprises an additional strap passage indicator 60, always in the active value, since, in this embodiment, it is always used when the base 20 is fastened to the seat 2. The base 20 comprises a strap passage 61 corresponding to an indicator 60, shown in FIG. 1, to allow the passage of the ventral strap of the vehicle safety belt, for the use of the automobile seat in group 1.

Figure 11:
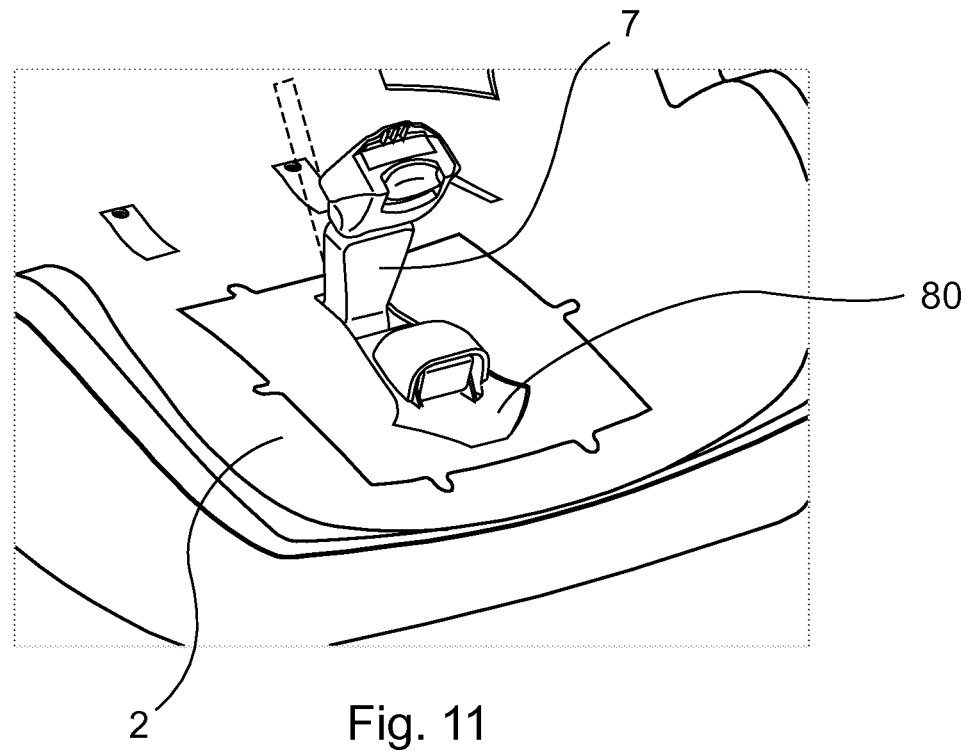
Figure 12:
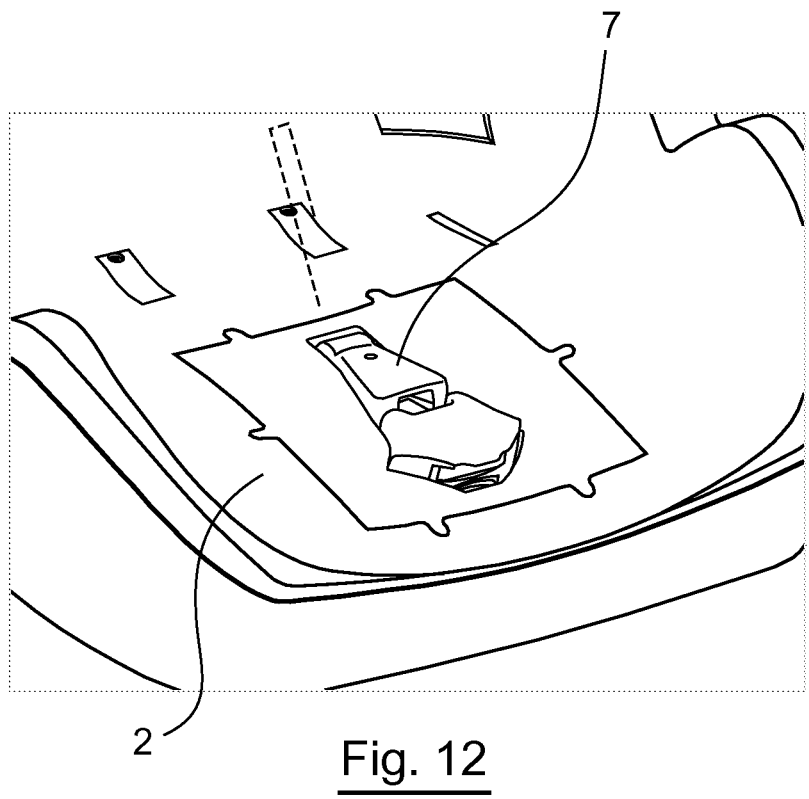

In this embodiment, the fastening of the base 20 to the seat 2 also provokes the accessibility of the crotch piece 7 as can be seen in the FIG. 11, while the removal or the unfastening of the base provokes the retraction of the crotch piece 7 into a housing 80 made in the seat. This makes it possible to erase any trace of presence of the harness when the automobile seat is used in group 2/3, although the harness 5 is still present in the automobile seat.

The lining of the automobile seat conceals the presence of the harness as can be seen in the FIG. 4 in particular.

Figure 13:
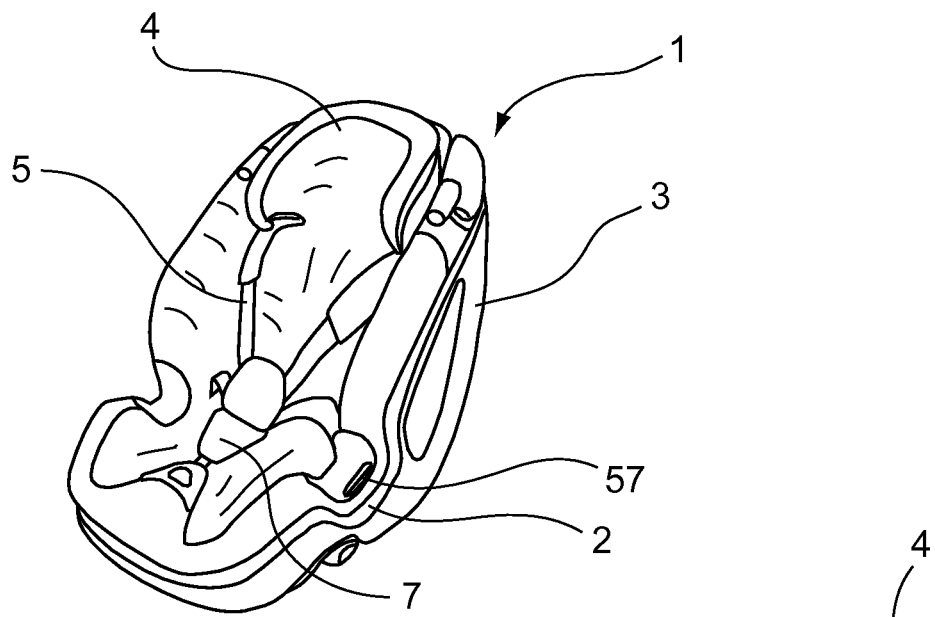
Figure 14:
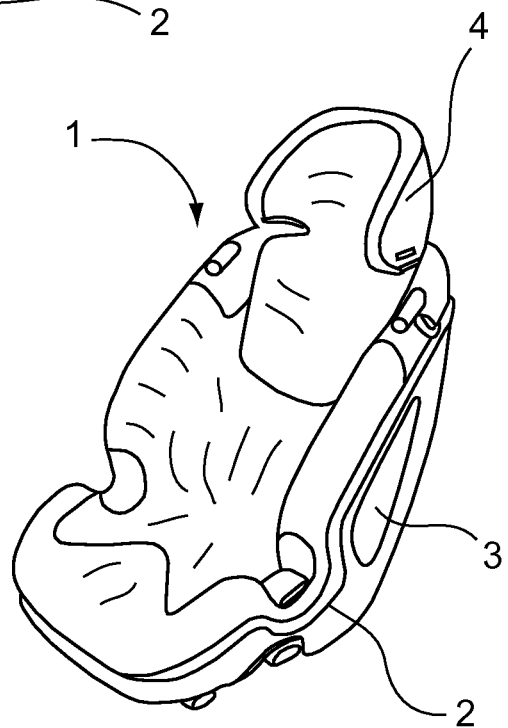
Figure 15:
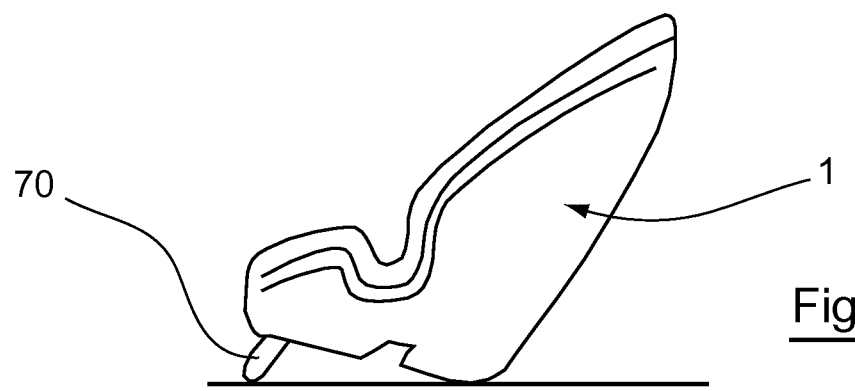
Figure 16A:
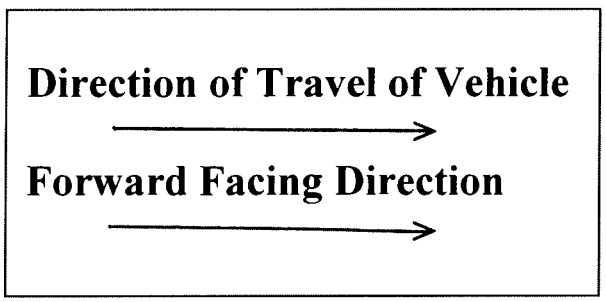
FIG. 16A depicts the forward facing direction of the seat of FIG. 2.
Figure 16B:
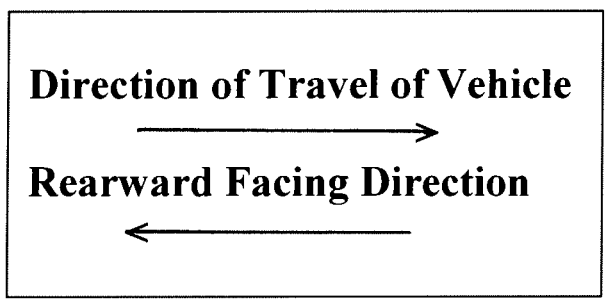
FIG. 16B depicts the rearward facing direction of the seat of FIG. 1.

FIGS. 13 to 15 shown another embodiment of the automobile seat in accordance with the invention, wherein the automobile seat does not comprise a base or has a permanent base, i.e. linked permanently to the seat. The seat can be inclined using a strut 70 which can be seen in the embodiment of FIG. 15. In this case, the third indicator 57 changes value according to the retraction of the harness which acts on this indicator by the intermediary of a cable, connecting rod and/or spring.

The invention is of course not limited to the examples which has just been described.

The controlling of the third indicator 57 can be provided independently from the base, for example using a cable or control rods driven by the handles 32.

Moreover, the visual indicators can be supplemented or replaced with means for blocking or closing the strap passages, in such a way as to further indicate more clearly to the user that this passage must not be used. For example, the base can act on a mobile wedge that comes to occupy at least partially the strap passage 57 when the base is present, and retracting into the armrest of the seat in the absence of the base, thus allowing for the passage of the strap.

Likewise, for the other strap passages, the change in colour can be replaced or accompanied by the displacement of flaps or of wedges, which block or release the passages according to the position of the handles 32.

In particular, the shoulder straps of the harness can be retractable or non-retractable. For example, they can require that they be removed in order to switch from the use of the automobile seat in group 1 to the use of the seat in group 2/3.

The headrest can be mobile relative to the seatback as in the examples shown, or not.

It is possible for the controlling of the value taken by the strap passage indicators to not be provided by a retraction of the shoulder straps of the harness for example, but by any other means of actuating that can be considered.

Throughout the description, the expressions "including a" and "comprising a" are to be understood as being synonymous respectively with the expressions "including at least one" and "comprising at least one", unless mentioned otherwise.

The range of values indicated are to be understood as including the limits, unless specified otherwise.

The various means described hereinabove can of course be implemented independently of the others, or according to diverse combinations.

The invention claimed is:

1. A juvenile seat comprises
a child support includes a seat shell movable from a rearward-facing direction to a forward-facing direction, the child support being formed to include a first belt path,
a first indicator associated with the first belt path and coupled to the child support to move from an active position to establish a first belt routing routed through the first belt path while the seat shell of the child support is in the rearward-facing direction to an inactive position to establish a second belt routing routed across the child support without extending through the first belt path while the seat shell of the child support is in the forward-facing direction, and
mover means for moving the first indicator from the active position to the inactive position upon reconfiguration of the seat shell of the child support from the rearward-facing direction to the forward facing direction so that a caregiver securing the juvenile seat in a vehicle is directed to route a seatbelt included in a vehicle associated with the child support along the first belt routing when the seat shell of the child support is in the rearward-facing direction and is directed to route a seatbelt included in a vehicle associated with the child support through the second belt routing when the seat shell of the child support is in the forward-facing direction.

2. The juvenile seat of claim 1, wherein the mover means includes a retractor spring arranged to bias the indicator to the active position and an extender coupled to the indicator to overcome the retractor spring force and move the indicator from the active position to the inactive position.

3. The juvenile seat of claim 2, wherein the extender includes a handle and a tip that contacts the indicator to move the indicator from the active position to the inactive position in response to user sliding the handle along a rod included in the child support.

4. The juvenile seat of claim 3, wherein the first indicator includes a mobile part, an indicator element coupled to the mobile part, and a lever coupled to the mobile part that is contacted by the tip to move the mobile part and the indicator element as a unit so that the indicator element is visible when the first indicator is in the active position and is hidden when the first indicator is in the inactive position.

5. The juvenile seat of claim 3, wherein the child support includes a first shoulder strap movable from an accessible position established when the seat shell of the child support is in the rearward-facing direction to a retracted position established when the seat shell of the child support is in the forward-facing direction, the first shoulder strap coupled to the extender for movement from the accessible position to the retracted position in response to a user moving the handle.

6. The juvenile seat of claim 1, further comprising a second indicator associated with a second belt path included in the child support, the second indicator coupled to the child support to move from an active position to establish a third belt routing routed without extending through the second belt path while the seat shell of the child support is in the rearward-facing configuration to a inactive position to establish a fourth belt routing routed through the second belt path while the seat shell of the child support is in the forward-facing direction.

7. The juvenile seat of claim 6, wherein the mover means moves the second indicator from the inactive position to the active position in response to reconfiguration of the seat shell of the child support from the rearward-facing direction to the forward facing direction.

8. The juvenile seat of claim 7, wherein the mover means includes a first handle and a second handle both coupled to a substantially horizontal rod included in the child support to slide along the rod, the first indicator moved from the active position to the inactive position in response to a user sliding the first handle along the rod away from the second handle, and the second indicator moved from the inactive position to the active position in response to a user sliding the second handle away from the first handle.

9. A juvenile vehicle seat for children, intended to be mounted to the seat of a motor vehicle in either a rearward-facing direction or a forward-facing direction, said juvenile vehicle seat comprising
two separate guide paths for a seatbelt of said motor vehicle intended to maintain said juvenile vehicle seat when said seat is used in a rearward-facing direction on a passenger seat of a vehicle and when said seat is used in a forward-facing direction on a passenger seat of a vehicle, the juvenile seat comprising,
means for adjusting a headrest of the juvenile vehicle seat for use in the rearward-facing direction or for use in the forward-facing direction, and
at least one passage indicator for a strap of said seatbelt of the vehicle able to have two different states, an active state and an inactive state, delivered by said means for adjusting a headrest.

10. The juvenile vehicle seat of claim 9, wherein said at least one passage indicator comprises at least one mobile part, blocking access to a strap passage defined on said juvenile vehicle seat, in said inactive state, and authorising access to said strap passage in said active state.

11. The juvenile vehicle seat of claim 9, wherein said at least one passage indicator comprises at least one lighted indicator element and having a first information able to be seen in said active state.

12. The juvenile vehicle seat of claim 9, wherein said means for adjusting a headrest takes into account the position of a mobile headrest in relation to said seatback.

13. The juvenile vehicle seat of claim 12, wherein the headrest is mobile in relation to the seatback between a first position between a minimum height and an intermediate height and a second position between the intermediate height and a maximum height, and in that said means for adjusting the headrest is configured to control the state provided by said at least one passage indicator according to whether the position of a headrest is in the first position or the second position.

14. The juvenile vehicle seat of claim 9, further comprising
at least one first strap passage integral with the seatback and intended to receive the chest strap of the seatbelt, when the juvenile vehicle seat is used in the rearwardly facing direction,
at least one second strap passage integral with the headrest and intended to receive the chest strap of the seatbelt, when the juvenile vehicle seat is used in the forwardly-facing direction,
at least one first indicator associated with each of the first passages and configured to have an active value when the juvenile vehicle seat is used in the rearwardly facing direction and an inactive value when the juvenile vehicle seat is used in the forwardly-facing direction, and
at least one second indicator associated with each of the second passages and configured to have an active value when the juvenile vehicle seat is used in the forwardly facing direction, and an inactive value when the juvenile vehicle seat is used in the rearwardly facing direction.

15. The juvenile vehicle seat of claim 9, further comprising a harness including shoulder straps that can be retracted into housings during the switching from the use in the rearwardly facing direction to the use in the forwardly-facing direction using means for actuating comprising one or more actuating handles.

16. The juvenile vehicle seat of claim 9, wherein when the juvenile vehicle seat is used in the rearwardly facing direction, it comprises a base.

17. The juvenile vehicle seat of claim 16, further comprising means for controlling said at least one passage indicator for a strap according to the presence or the absence of a base whereon the seat can be mounted.

18. The juvenile vehicle seat of claim 17, wherein said base comprises at least one element controlling the passage in the inactive state of an indicator associated with a passage of the ventral strap of said seatbelt.

19. The juvenile vehicle seat of claim 9, further comprising means for retracting a crotch piece when the juvenile vehicle seat is used in the forwardly-facing direction and to cause the crotch piece to appear when the juvenile vehicle seat is used in the rearwardly facing direction.

* * * * *